US012695764B2

(12) United States Patent
James Stephen et al.

(10) Patent No.: US 12,695,764 B2
(45) Date of Patent: Jul. 28, 2026

(54) AUTOMATED TAGGING OF APPLICATIONS BASED ON REGULATORY DOMAIN

(71) Applicant: International Business Machines Corporation, Armonk, NY (US)

(72) Inventors: Julian James Stephen, Yorktown Heights, NY (US); Anca Sailer, Scarsdale, NY (US); Shriti Priya, White Plains, NY (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 18/890,952

(22) Filed: Sep. 20, 2024

(65) Prior Publication Data

US 2026/0089171 A1     Mar. 26, 2026

(51) Int. Cl.
     *H04L 9/40*          (2022.01)
     *G06F 16/28*         (2019.01)
(52) U.S. Cl.
     CPC ........ *H04L 63/1416* (2013.01); *G06F 16/285* (2019.01)
(58) Field of Classification Search
     CPC ........................... H04L 63/1416; G06F 16/285
     See application file for complete search history.

(56) References Cited

U.S. PATENT DOCUMENTS 9,210,030 B1 * 12/2015 Miller ................ G06Q 30/0241
2018/0095807 A1 * 4/2018 Wu ..................... G06F 9/45512
2025/0039067 A1 * 1/2025 Crabtree ............. H04L 63/1433

FOREIGN PATENT DOCUMENTS

CN   115346635 A   11/2022
CN   116631573 A    8/2023
CN   116955539 B   12/2023
CN   117291515 A   12/2023
CN   117689942 A    3/2024
            (Continued)

OTHER PUBLICATIONS

Harkous et al., "Polisis: Automated Analysis and Presentation of Privacy Policies Using Deep Learning", Proceedings of the 27th USENIX Security Symposium, Aug. 15-17, 2018m Baltimore, MD, 19 pages, <https://www.usenix.org/system/files/conference/usenixsecurity18/sec18-harkous.pdf>.
            (Continued)

*Primary Examiner* — Beemnet W Dada
(74) *Attorney, Agent, or Firm* — CHIP LAW GROUP

(57)          ABSTRACT

Automated tagging of applications based on regulatory domain includes obtaining request data associated with a service request. The service request is associated with an application. Based on the request data, classification data associated with the service request is generated. The classification data is indicative of an operation associated with the application, or a service domain associated with the application. Based on the classification data, a regulatory tag is determined for the application. The regulatory tag is determined from a set of defined regulatory tags. A set of controls associated with the service request is determined based on the regulatory tag. The request data is validated against the set of controls and the service request is executed based on the validation of the request data.

18 Claims, 7 Drawing Sheets

(56)     References Cited

FOREIGN PATENT DOCUMENTS

CN      118153959  A      6/2024
KR      102575129  B1     9/2023

OTHER PUBLICATIONS

Iyer et al., "Towards automated learning of access control policies enforced by web applications", SACMAT '23, Jun. 7-9, 2023, Trento, Italym © 2023 Copyright, 6 pages.
Kim et al., "AI-IDS: Application of Deep Learning to Real-Time Web Intrusion Detection", IEEE Access, current version Apr. 24, 2020, vol. 8, 17 pages.
Le et al., "Automated Inference of Access Control Policies for Web Applications", SACMAT'15, Jun. 1-3, 2015, Vienna, Austria, Copyright 2015 ACM, 12 pages.
Park et al., "Anomaly Detection for HTTP Using Convolutional Autoencoders", IEEE Access, current version Dec. 18, 2018, vol. 6, 18 pages.
Zander et al., "Automated traffic classification and application identification using machine learning", Proceedings of the IEEE Conference on Local Computer Networks 30th Anniversary (LCN'05), 2005, IEEE, 9 pages.

* cited by examiner

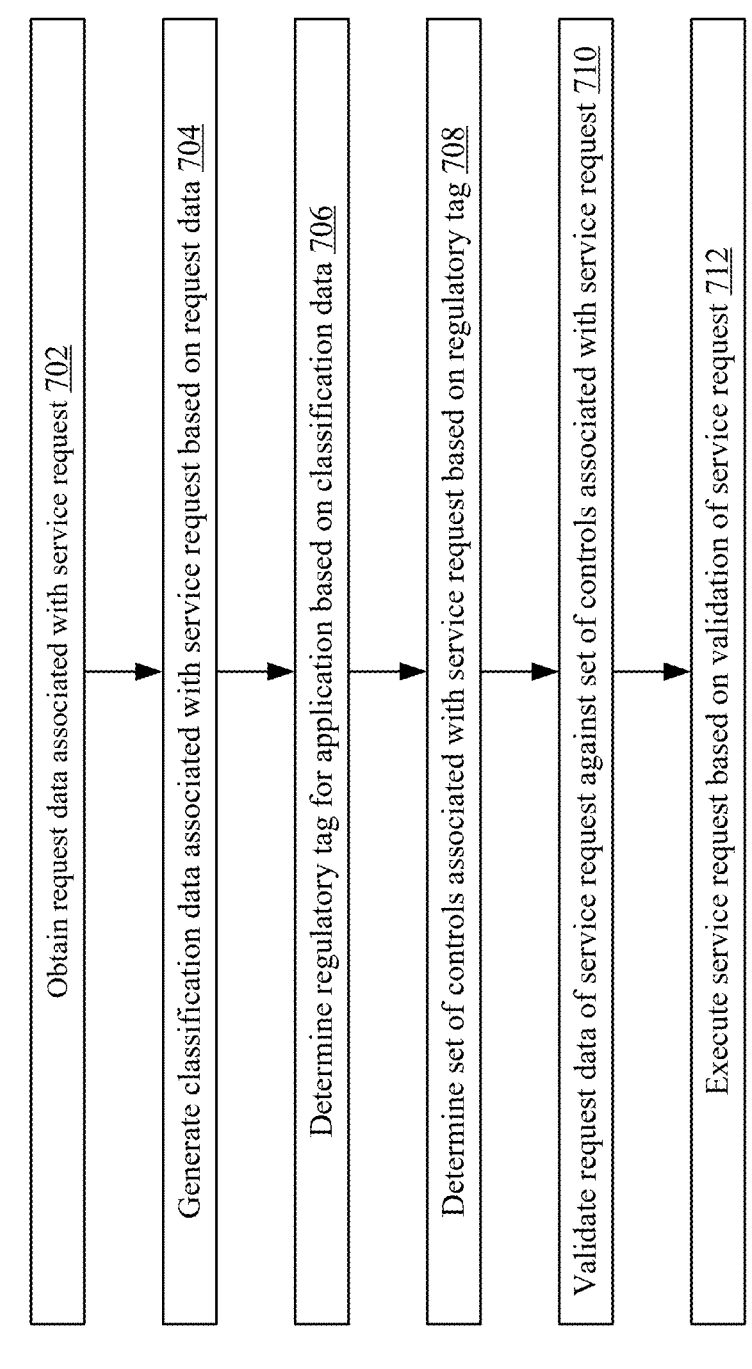

Obtain request data associated with service request 702

Generate classification data associated with service request based on request data 704

Determine regulatory tag for application based on classification data 706

Determine set of controls associated with service request based on regulatory tag 708

Validate request data of service request against set of controls associated with service request 710

Execute service request based on validation of service request 712

AUTOMATED TAGGING OF APPLICATIONS BASED ON REGULATORY DOMAIN

BACKGROUND

The present disclosure relates to application tagging and, more particularly, to automated application tagging based on regulatory domain.

In recent years, adoption of cloud-native and microservices-based architectures has significantly transformed the software development landscape. These architectures enable organizations to build and deploy scalable, resilient, and flexible applications by breaking down complex applications into smaller, loosely coupled services. This approach facilitates rapid development, deployment, and iteration, allowing to respond quickly to market demands and technological advancements.

Further, as organizations increasingly adopt cloud-native architectures, applications in cloud-native ecosystems are subject to frequent changes, including updates, the addition of new microservices, and alterations to existing services. These changes may be driven by various factors, such as feature enhancements, bug fixes, and optimizations. Consequently, the behavior of applications and their interaction patterns may evolve continuously. Furthermore, the increasing prevalence of cyber threats necessitates robust security policies to protect sensitive data and maintain the integrity of applications.

SUMMARY

According to an embodiment of the present disclosure, a computer-implemented method for automated tagging of applications based on regulatory domain is described. The computer-implemented method comprises obtaining, by a computer, request data associated with a service request. The service request is associated with an application. The computer-implemented method further comprises generating, by the computer, classification data associated with the service request based on the request data. The classification data is indicative of at least one of an operation associated with the application, or a service domain associated with the application. The computer-implemented method further comprises determining, by the computer, a regulatory tag for the application based on the classification data. The regulatory tag is determined from a set of defined regulatory tags. The computer-implemented method further comprises determining, by the computer, a set of controls associated with the service request based on the regulatory tag. The computer-implemented method further comprises validating, by the computer, the request data of the service request against the set of controls associated with the service request. The method further comprises executing, by the computer, the service request based on the validation of the service request.

According to an embodiment of the present disclosure, a computer system for automated tagging of applications based on regulatory domain is described. The system comprises a processor set, one or more computer-readable storage media, and program instructions stored on the one or more computer-readable storage media. The program instructions are executable by the processor set to cause the processor set to obtain request data associated with a service request. The service request is associated with an application. Further, the program instructions cause the processor set to generate classification data associated with the service request based on the request data. The classification data is indicative of at least one of an operation associated with the application, or a service domain associated with the application. The program instructions further cause the processor set to determine a regulatory tag for the application based on the classification data. The regulatory tag is determined from a set of defined regulatory tags. The program instructions further cause the processor set to determine a set of controls associated with the service request based on the regulatory tag. The program instructions further cause the processor set to validate the request data of the service request against the set of controls associated with the service request. The program instructions further cause the processor set to execute the service request based on the validation of the service request.

According to an embodiment of the present disclosure, a computer program product for automated tagging of applications based on regulatory domain is described. The computer program product comprises a computer-readable storage medium having program instructions embodied therewith. The program instructions are executable by a system to cause the system to obtain request data associated with a service request. The service request is associated with an application. The system is further configured to generate classification data associated with the service request based on the request data. The classification data is indicative of at least one of an operation associated with the application, or a service domain associated with the application. The system is further configured to determine a regulatory tag for the application based on the classification data. The regulatory tag is determined from a set of defined regulatory tags. The system is further configured to determine a set of controls associated with the service request based on the regulatory tag. The system is further configured to validate the request data of the service request against the set of controls associated with the service request. The system is further configured to execute the service request based on the validation of the service request.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein:

FIG. 7 is a flowchart that illustrates an exemplary method for automated tagging of an application based on regulatory domain, in accordance with an embodiment of the disclosure.

DETAILED DESCRIPTION

Figure 1:
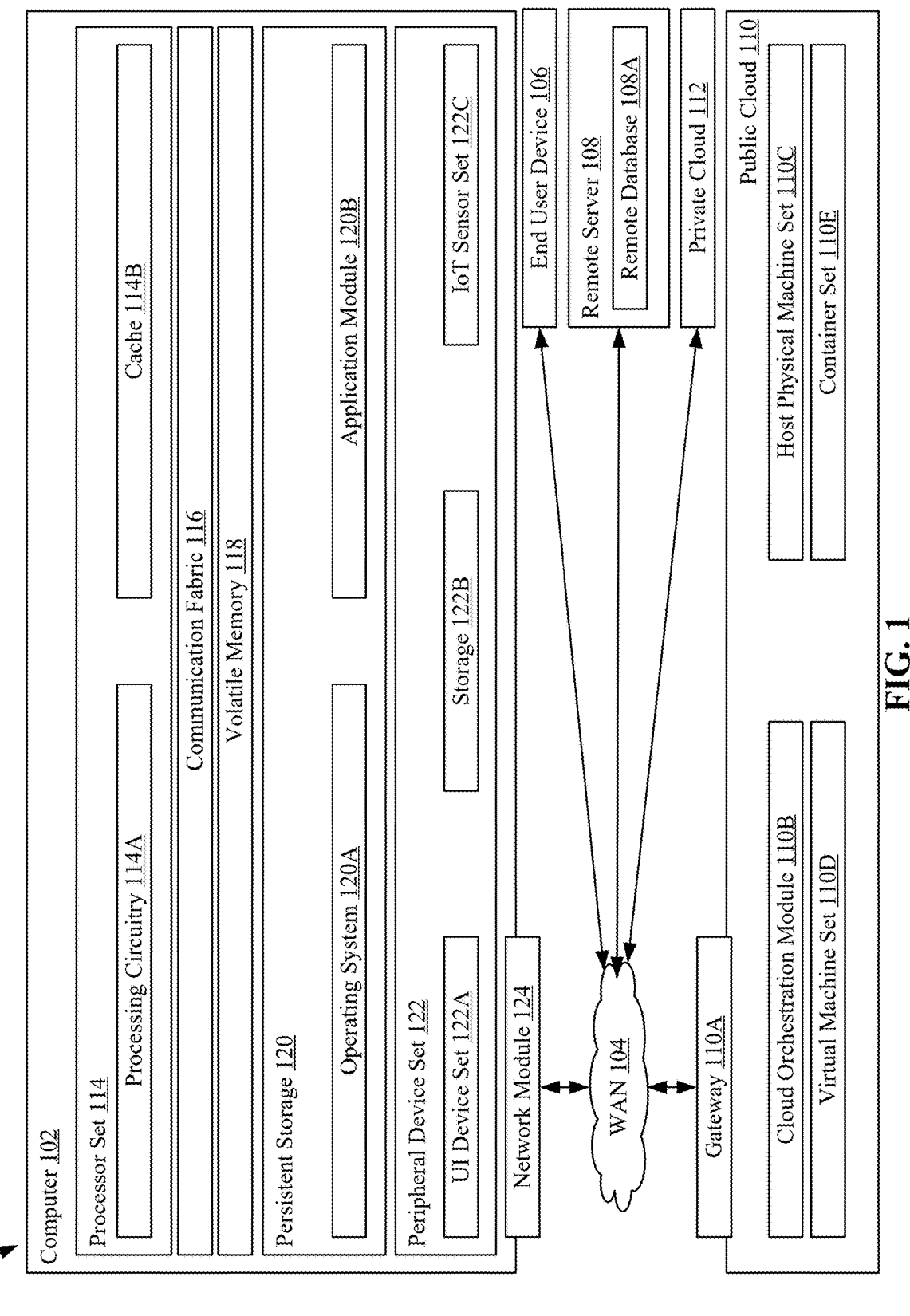
FIG. 1 is a diagram that illustrates a computing environment for automated tagging of applications based on regulatory domain, in accordance with an embodiment of the disclosure.

According to an embodiment of the disclosure, a computer-implemented method for automated tagging of applications based on regulatory domain is described. The computer-implemented method comprises obtaining, by a computer, request data associated with a service request. The service request is associated with an application. The computer-implemented method further comprises generating, by the computer, classification data associated with the service request based on the request data. The classification data is indicative of at least one of an operation associated with the application, or a service domain associated with the application. The computer-implemented method further comprises determining, by the computer, a regulatory tag for the application based on the classification data. The regulatory tag is determined from a set of defined regulatory tags. The computer-implemented method further comprises determining, by the computer, a set of controls associated with the service request based on the regulatory tag. The computer-implemented method further comprises validating, by the computer, the request data of the service request against the set of controls associated with the service request. The method further comprises executing, by the computer, the service request based on the validation of the service request. To this end, based on the tagging of the applications, it may become easier to apply and enforce appropriate policies across various microservices, ensuring that all relevant compliance and security standards are met consistently.

In an embodiment, the computer-implemented method further comprises validating, by the computer, the request data of the service request against the set of controls associated with the service request. The computer-implemented method further comprises executing, by the computer, the service request based on the validation of the service request.

In an embodiment, the computer-implemented method further comprises generating, by the computer, a notification associated with the service request based on the validation.

In an embodiment, the computer-implemented method further comprises validating, by the computer, the request data of the service request against the set of controls associated with the service request. The computer-implemented method further comprises generating, by the computer, updated request data associated with the service request upon detection of invalid service request. The updated request data is generated based on the request data and the set of controls. The updated request data is compliant with the set of controls.

In an embodiment, the computer-implemented method further comprises receiving, by the computer, service data associated with each of a plurality of service requests. The service data associated with each of the plurality of service requests comprises at least one of input format data or endpoint data. The computer-implemented method further comprises identifying, by the computer, a set of service requests from the plurality of service requests based on the service data of each of the plurality of service requests. The set of service requests is associated with the application. Further, the set of service requests comprises the service request. The computer-implemented method further comprises generating, by the computer, characteristics data for the application based on the service data associated with each service request of the set of service requests. The computer-implemented method further comprises determining, by the computer, the regulatory tag for the application based on the characteristics data.

In an embodiment, the computer-implemented method further comprises determining, by the computer, interface data associated with one or more interface components of the application based on the set of service requests associated with the application. The computer-implemented method further comprises determining, by the computer, a set of regulatory controls associated with each of the one or more interface components based on the characteristics data and the regulatory tag.

In an embodiment, the computer-implemented method further comprises generating, by the computer, a first textual script associated with the service request based on the request data. The computer-implemented method further comprises inputting, by the computer, the first textual script associated with the service request to an artificial intelligence (AI) model to receive a first output. The computer-implemented method further comprises generating, by the computer, the classification data associated with the service request based on the first output.

In an embodiment, the computer-implemented method further comprises generating, by the computer, a second textual script associated with the service request based on the regulatory tag for the application. The computer-implemented method further comprises inputting, by the computer, the second textual script associated with the service request to the AI model to receive a second output. The computer-implemented method further comprises determining, by the computer, the set of controls associated with the service request based on the second output.

In an embodiment, the computer-implemented method further comprises retrieving, by the computer, a plurality of controls associated with a plurality of regulatory domains. The computer-implemented method further comprises determining, by the computer, the set of controls associated with the service request to the application from the plurality of controls using the AI model. The set of controls is associated with the application.

In an embodiment, the AI model is a large language model (LLM).

In an embodiment, the request data comprises at least one of user input data or service request resource locator data.

According to another embodiment of the disclosure, a computer system for automated tagging of applications based on regulatory domain is described. The system comprises a processor set, one or more computer-readable storage media, and program instructions stored on the one or more computer-readable storage media. The program instructions are executable by the processor set to cause the processor set to obtain request data associated with a service request. The service request is associated with an application. Further, the program instructions cause the processor set to generate classification data associated with the service request based on the request data. The classification data is indicative of at least one of an operation associated with the application, or a service domain associated with the application. The program instructions further cause the processor set to determine a regulatory tag for the application based on the classification data. The regulatory tag is determined from a set of defined regulatory tags. The program instructions further cause the processor set to determine a set of controls associated with the service request based on the regulatory tag. The program instructions further cause the processor set to validate the request data of the service request against the set of controls associated with the service request. The program instructions further cause the processor set to execute the service request based on the validation of the service request.

In an embodiment, the program instructions further cause the processor set to receive service data associated with each of a plurality of service requests. The service data associated with each of the plurality of service requests comprises at least one of input format data or endpoint data. The program instructions further cause the processor set to identify a set of service requests from the plurality of service requests based on the service data of each of the plurality of service requests. The set of service requests is associated with the application. Further, the set of service requests comprises the service request. The program instructions further cause the processor set to generate characteristics data for the application based on the service data associated with each service request of the set of service requests. The program instructions further cause the processor set to determine the regulatory tag for the application based on the characteristics data.

In an embodiment, the program instructions further cause the processor set to determine interface data associated with one or more interface components of the application based on the set of service requests associated with the application. The program instructions further cause the processor set to determine a set of regulatory controls associated with each of the one or more interface components based on the characteristics data and the regulatory tag.

In an embodiment, the program instructions further cause the processor set to generate a first textual script associated with the service request based on the request data. The program instructions further cause the processor set to input the first textual script associated with the service request to an artificial intelligence (AI) model to receive a first output. The program instructions further cause the processor set to generate the classification data associated with the service request based on the first output.

In an embodiment, the program instructions further cause the processor set to generate a second textual script associated with the service request based on the regulatory tag for the application. The program instructions further cause the processor set to input the second textual script associated with the service request to the AI model to receive a second output. The program instructions further cause the processor set to determine the set of controls associated with the service request based on the second output.

In an embodiment, the program instructions further cause the processor set to retrieve a plurality of controls associated with a plurality of regulatory domains. The program instructions further cause the processor set to determine the set of controls associated with the service request to the application from the plurality of controls, using the AI model. The set of controls is associated with the application.

In an embodiment, the program instructions further cause the processor set to generate updated request data associated with the service request upon detection of invalid service request. The updated request data is generated based on the request data and the set of controls. Further, the updated request data is compliant with the set of controls.

According to an embodiment of the present disclosure, a computer program product for automated tagging of applications based on regulatory domain is described. The computer program product comprises a computer-readable storage medium having program instructions embodied therewith. The program instructions are executable by a system to cause the system to obtain request data associated with a service request. The service request is associated with an application. The system is further configured to generate classification data associated with the service request based on the request data. The classification data is indicative of at least one of an operation associated with the application, or a service domain associated with the application. The system is further configured to determine a regulatory tag for the application based on the classification data. The regulatory tag is determined from a set of defined regulatory tags. The system is further configured to determine a set of controls associated with the service request based on the regulatory tag. The system is further configured to validate the request data of the service request against the set of controls associated with the service request. The system is further configured to execute the service request based on the validation of the service request.

In an embodiment of the disclosure, the program instructions that are executable by the system further cause the system to receive service data associated with each of a plurality of service requests. The service data associated with each of the plurality of service requests comprises at least one of input format data or endpoint data. The program instructions that are executable by the system further cause the system to identify a set of service requests from the plurality of service requests based on the service data of each of the plurality of service requests. The set of service requests is associated with the application. Further, the set of service requests comprises the service request. The program instructions that are executable by the system further cause the system to generate characteristics data for the application based on the service data associated with each service request of the set of service requests. The program instructions that are executable by the system further cause the system to determine the regulatory tag for the application based on the characteristics data.

In an embodiment of the disclosure, the program instructions that are executable by the system further cause the system to determine interface data associated with one or more interface components of the application based on the set of service requests associated with the application. The program instructions that are executable by the system further cause the system to determine a set of regulatory controls associated with each of the one or more interface components based on the characteristics data and the regulatory tag.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment 100 for automated tagging of applications based on regulatory domain, in accordance with an embodiment of the disclosure. The diagram contains an exemplary environment for execution of at least one module involved in performing the methods, such as an application tagging module 120B associated with the automated tagging of the service requests. In addition to the application tagging module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the application tagging module 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as a remote database 108A. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the methods"). These computer-readable program instructions are stored in various types of computer-readable storage media, such as the cache 114B and the other storage media discussed below. The program instructions, and associated data, are accessed by the processor set 114 to control and direct the performance of the methods. In computing environment 100, at least some of the instructions for performing the methods may be stored in the application tagging module 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The application tagging module 120B typically includes the at least one module involved in performing the methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer, and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In other embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
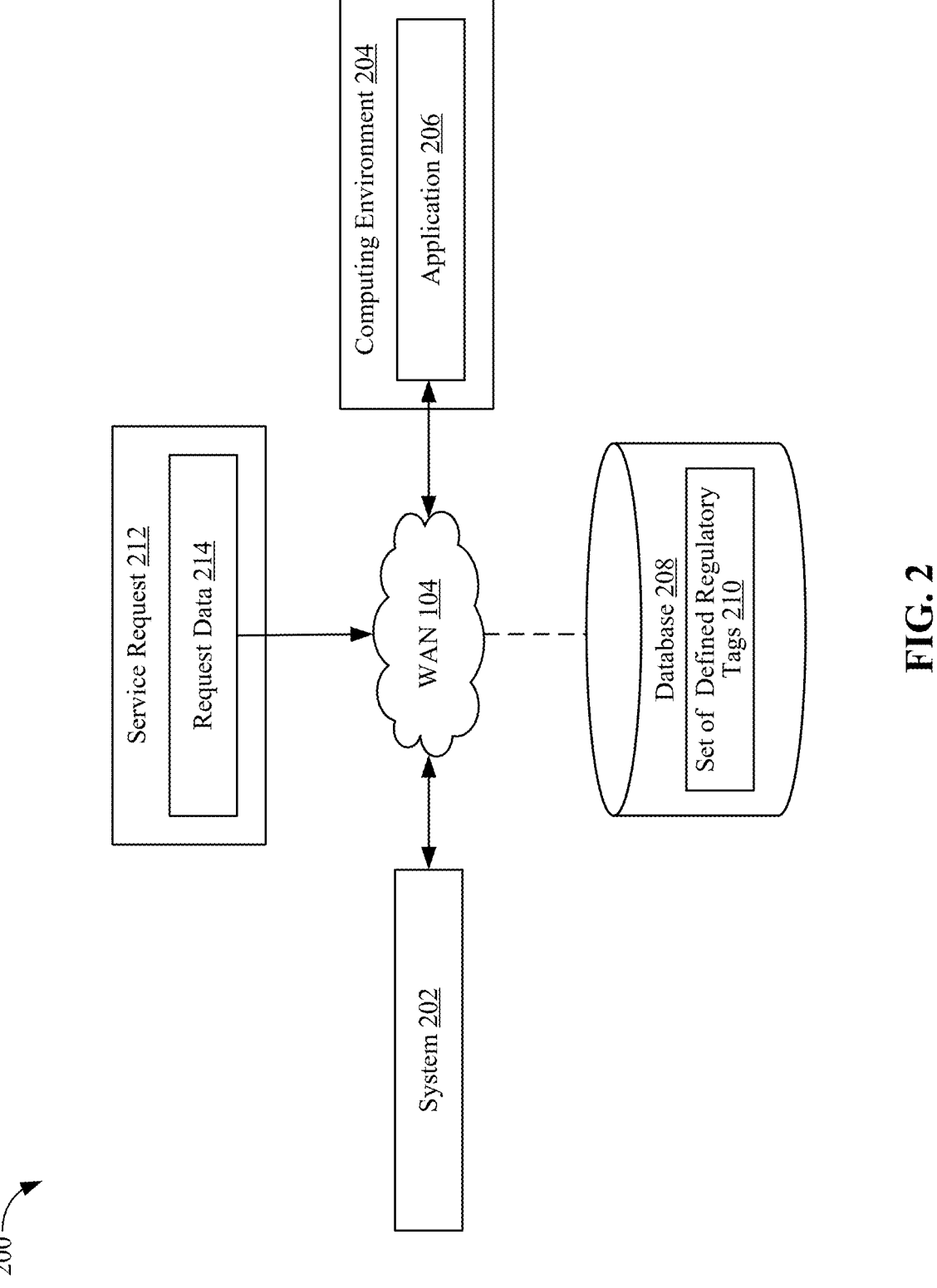
FIG. 2 is a diagram that illustrates a network environment in which a system for automated tagging of the applications is implemented, in accordance with an embodiment of the disclosure.

FIG. 2 illustrates a network environment 200 in which a system 202 for automated application tagging is implemented, in accordance with an embodiment of the disclosure. FIG. 2 is explained in conjunction with elements from FIG. 1. The network environment 200 includes the system 202, a computing environment 204, and a database 208. The computing environment includes an application 206. The database 208 includes a set of defined regulatory tags 210. The network environment 200 further includes the WAN 104 of FIG. 1. In an embodiment, the system 202 may be an exemplary embodiment of the computer 102 of FIG. 1.

In an example, a service request 212 may be raised for the application 206. The service request 212 may include request data 214. The service request 212 may be raised by a user computing environment or a user device accessing the application 206 for carrying out one or more operations.

In accordance with an embodiment, the database 208 may refer to a structured collection of data that is stored and managed in a manner that facilitates efficient retrieval, updating, and management. The database 208 may be implemented using software and hardware resources. The database 208 may operate in a centralized or distributed computing environment. Examples of database may include, but are not limited to, relational database, NoSQL database, and in-memory database. Pursuant to the present disclosure, the database 208 may be a relational database employing structured query language (SQL) for managing data stored with predefined relationships into, for example, tables. The database 208 may store the set of defined regulatory tags 210 along with other data that may be generated or received by the system 202 and/or the computing environment 204 during their operation. Although not shown, the database 208 may also store the request data 214 of the service request 212 raised for the application 206.

The system 202 may include suitable logic, circuitry, interfaces, and/or code that is configured to perform the automated tagging of the application 206. In an example, the application 206 corresponds to a software program designed to perform specific tasks or provide specific services for users. The application 206 may be web-based, mobile, desktop, or cloud-native, and may be typically built to solve particular problems, automate processes, or facilitate interactions. The application 206 may include a user interface for interaction and a backend that handles data processing, storage, and business logic. Applications often interact with other systems and services, leveraging various application programming interfaces (APIs) and protocols to perform their functions.

In an example, the application 206 may be composed of multiple microservices. Each microservice is a distinct, independently deployable component that performs a specific function within the larger application. The application 206 may have different endpoints and microservices may have a modular structure, allowing for scalability, flexibility, and easier maintenance. Further, the application 206 may expose multiple endpoints, each representing a unique uniform resource locator (URL) or uniform resource identifier (URI) where specific functionalities or resources can be accessed. These endpoints serve as the interface for interacting with the application 206, enabling communication between clients or user devices and the application's services.

The application 206 may be accessible to user(s) or client(s) over the Internet. It may be noted that such an illustration of the application 206 to be accessible over the Internet is only exemplary and should not be construed as a limitation. In an embodiment, the application 206 may be co-located within a user computing environment in which user devices may function. To this end, user devices associated with one or more users within the user computing environment may access the application 206 to perform certain tasks and operations, such as to utilize a service, and so forth.

In an example, each endpoint of the multiple endpoints of the application 206 may perform or correspond to a specific function, such as retrieving data, submitting data, or performing operations. Further, the different endpoints may handle different types of requests, such as user management, order processing, data analytics, etc. The different endpoints may have varying levels of access control, security measures, and compliance requirements. Each of the multiple endpoints may use various protocols (e.g., hypertext transfer protocol (HTTP), hypertext transfer protocol secure (HTTPS), remote procedure call (gRPC), WebSocket, etc.) depending on a nature of communication required with the particular endpoint of the application 206.

In an example, the application 206 may be implemented as a collection of microservices. In this regard, the application 206 may be implemented as a collection of loosely coupled services. In a microservices architecture, services are fine-grained, and the protocols are lightweight. For example, the application 206 may be an e-commerce application. In such a case, the different microservices of the application 206 may include, but are not limited to, product service, cart service, order service, user service, and notification service. Further, in a microservices architecture, each service typically exposes its own set of endpoints. These endpoints serve as entry points for communication with a particular service of the application 206. For example, the product service may expose an endpoint, for example, "/api/products" for listing of products and "/api/products/{id}" for product details of a particular product.

In accordance with an embodiment, the computing environment 204 may refer to technical infrastructure and ecosystem in which the application 206 operates. The computing environment 204 encompasses hardware, software, networks, and external systems that collectively support the deployment, execution, and management of the application 206. In an example, the computing environment 204 may include physical or virtual machines that host the application 206. The physical or virtual machines may provide computational resources like CPU, memory, and storage. In addition, the computing environment 204 may include network equipment, for example, but not limited to, routers, switches, and firewalls. The computing environment 204 may include storage systems, for example, but not limited to, databases, file servers, and cloud storage. Further, the computing environment 204 may have a cloud-native architecture for development and deployment of the application 206. In an example, the computing environment 204 may be a cloud-native, microservices-based environment.

As organizations increasingly adopt cloud-native architectures for developing applications, challenges owing to dynamic nature of these environments may arise. In particular, applications in cloud-native ecosystems are subject to frequent changes, including updates, the addition of new microservices, and alterations to existing services. These changes may be driven by various factors, such as feature enhancements, bug fixes, and optimizations. Consequently, the behavior of applications and their interaction patterns may evolve continuously. Further, in addition to technological advancements, regulatory and security requirements need to be followed while handling user data. Organizations must adhere to various compliance frameworks, such as general data protection regulation (GDPR), health insurance portability and accountability act (HIPAA), and payment card industry data security standard (PCI DSS), that mandate specific data handling, privacy, and security measures or policies. Furthermore, the increasing prevalence of cyber threats necessitates robust security policies to protect sensitive data and maintain the integrity of applications.

To this end, the dynamic nature of environments within which applications are developed, deployed, and utilized presents a significant challenge in ensuring that compliance and security policies are appropriately applied and maintained. As applications undergo changes, it becomes difficult to determine which policies are applicable to individual endpoints or services within the application. This difficulty arises due to, for example, continuous deployment and modification of microservices resulting in a constantly evolving application landscape. Moreover, determining appropriate policies for applications may also be challenging owing to applications having multiple endpoints, where each endpoint may have distinct function and data requirement. In certain cases, the distributed nature of microservices may obscure visibility into the application architecture and data flows, further complicating the identification of policy requirements. Therefore, ensuring that each endpoint complies with relevant security and compliance rules is complex and error prone.

Given these challenges, there is a need for an efficient solution for dynamically identifying and applying appropriate compliance and security policies to individual endpoints of an application. Accordingly, the present disclosure provides the system 202 for automated tagging of applications, such as the application 206 based on regulatory domain. The system 202 may be configured to detect a regulatory domain of the application 206 and tag the application, specifically, each of multiple endpoints of the application based on the regulatory domain. The system 202 may enhance the ability of organizations to maintain compliance with regulatory standards, protect sensitive data, and secure the applications against potential threats.

The system 202 may reduce the dependency on manual tagging, minimize errors, and improve overall application management and policy compliance. By automating the tagging and management processes, organizations, or the computing environment 204 may achieve better control over their cloud environments, efficient data handling, and reduce security threats.

The present disclosure also provides an automated method for managing the application 206 used by a user. This method enables dynamic assignment and management of regulatory tags to applications, such as the application 206 ensuring secure and efficient policy compliance and data handling.

The system 202 is configured to obtain the request data 214 associated with the service request 212. The service request 212 is associated with an application, e.g., a particular endpoint of a service or a microservice of the application 206. The system 202 is further configured to generate classification data associated with the service request 212 based on the request data 214. The classification data is indicative of an operation associated with the application 206, or a service domain associated with the application 206. The system 202 is further configured to determine a regulatory tag for the application 206 based on the classification data. The regulatory tag is determined from the set of defined regulatory tags 210. The system 202 is further configured to determine a set of controls associated with the service request 212 based on the regulatory tag. In an example, the system 202 is further configured to validate the request data 214 of the service request 212 against the set of controls associated with the service request 212 and execute the service request 212 based on the validation of the service request 212. Examples of the system 202 may include, but are not limited to, a computing device, a virtual computing device, a mainframe machine, a server, a computer workstation, a smartphone, a cellular phone, a mobile phone, a gaming device, a consumer electronic (CE) device and/or any other device with trace calculation capabilities.

The computing environment 204 may include suitable logic, circuitry, and interfaces, and/or code that may be configured to enable various local and/or remote resources and/or devices to access applications offered by the computing environment 204. The computing environment 204 may include the application 206. The application 206 may include a collection of various services and/or microservices accessible through a plurality of endpoints of the application 206.

In an embodiment, the computing environment 204 may be cloud environment or a micro-service environment. Moreover, to deploy the application 206, the computing environment 204 may provide access to the various services associated with various operations of the application 206. The computing environment 204 is further configured to provide local connection to the application 206 for operation thereof and store data generated by the services and/or the microservices of the application 206. The computing environment 204 is configured to enable a communication among each service of the various services using a set of application programmable interfaces (APIs). The set of APIs includes, but is not limited to, a HTTP, a HTTPS, or restful APIs. The computing environment 204 may be implemented as a server or a cloud server and may execute operations through web applications, cloud applications, HTTP requests, repository operations, file transfer, and the like. Other example implementations of the computing environment 204 may include, but are not limited to, a database server, a file server, a web server, a media server, an application server, a mainframe server, or a cloud computing server.

In an embodiment, the computing environment 204 is implemented as a plurality of distributed cloud-based services or microservices of applications by use of several technologies that are well known to those ordinarily skilled in the art. A person with ordinary skill in the art will understand that the scope of the disclosure may not be limited to the implementation of the computing environment 204 and the system 202 as two separate entities. In certain cases, the functionalities of the computing environment 204 may be incorporated in its entirety or at least partially in the system 202 or vice versa, without a departure from the scope of the disclosure.

In operation, the system 202 is configured to obtain request data 214 associated with the service request 212. The service request 212 is associated with the application 206. In an example, the service request 212 refers to a specific call or invocation made by a client or a user to a service endpoint in order to perform a particular operation or access a resource. Pursuant to the present disclosure, the service request 212 may be a call made for accessing a service of the application 206. In an example, a user associated with the application 206 may transmit the service request 212 via the WAN 104.

Further, the request data 214 may include specific information or payload sent as part of the service request 212. The request data 214 provides information, parameters, inputs, or criteria required by the service of the application 206 to fulfill the service request 212 and generate an appropriate response.

The system 202 is configured to generate classification data associated with the service request 212 based on the request data 214. The classification data is indicative of an operation associated with the application 206 and/or a service domain associated with the application 206. The system 202 is configured to generate classification data to classify the service request 212 as belonging to a specific operation or service provided by the application 206 and/or a specific service or business domain associated with the application 206.

In an example, the application 206 may include code that is configured to execute a set of instructions associated with one or more operations. Further, based on each of the one or more operations, the system 202 may classify the service request 212 as belonging to one of the one or more operations. Examples of the one or more operations may include, but are not limited to, communication operations, financial operations, input/output (I/O) operations, user interface operations, multimedia operations, security operations, memory management operations, and computing operations.

In addition to the operation, the system 202 may also classify the service request 212 as belonging to a service domain. Such classification based on service domain is crucial owing to specific needs, functionalities and security requirements for different service or business domains. Examples of the different service domains may include, but are not limited to, e-commerce, healthcare, finance and banking, education, logistics and supply chain, real estate, travel and hospitality, manufacturing, retail, entertainment and media, human resources, telecommunications, construction, legal and compliance, public sector and government, and non-profitable and charitable organization management.

The system 202 is further configured to determine a regulatory tag for the application 206 based on the classification data. The regulatory tag is determined from the set of defined regulatory tags 210. In an example, the system 202 may be configured to identify a regulatory domain of the application 206 based on the classification data of the service request 212. In certain cases, based on classification data of multiple service requests raised for the application 206, the regulatory domain of the application 206 may be identified. For example, the regulatory domain of the application 206 is identified based on the service domain within the classification data of the service request 212.

In an example, the regulatory domain may indicate a specific set of laws, regulations, standards, policies, and guidelines that govern the operation, handling of data, and overall compliance requirements within a particular context, such as a service or a microservice of the application 206. The identification of the regulatory domain may include assessing and categorizing the service request 212 to ascertain applicable regulatory guidelines and compliance requirements that govern the processing of the service request 212. The regulatory domain may include, for example, legal and regulatory frameworks that may pertain to data privacy, security, industry-specific regulations, and international laws. Based on the identified regulatory domain of the application 206, the regulatory tag is determined for the application 206. For example, the regulatory tag may be a particular tag corresponding to the regulatory domain from the set of defined regulatory tags 210.

The system 202 is further configured to determine a set of controls associated with the service request 212 based on the regulatory tag. In an example, the set of controls may refer to specific policies, procedures, mechanisms, and technologies implemented to ensure that the service request 212, particularly, the request data 214 comply with applicable laws, regulations, and standards. The set of controls may be used to manage risks, protect sensitive data, and uphold regulatory requirements across various stages of handling the service request 212. The set of controls may be associated with, for example, access controls, data encryption and protection controls, data integrity controls, compliance, and regulatory controls, monitoring and audit controls, incident response controls, privacy controls, training an awareness controls, or a combination thereof.

In an example, based on the regulatory tag, the set of controls may be determined. For example, the set of controls may include specific laws, standards, and guidelines that apply to the request data 214 of the service request 212 based on factors, such as data type, jurisdiction, and the regulatory tag or the regulatory domain. In an example, the set of controls is determined based on the regulatory tag indicating a business domain to which the service request 212 relate, as well as the specific operation associated with the service request 212.

In an example, the classification data of the service request 212 may include an operation associated with 'new user registration' and a service domain may correspond to 'finance'. Subsequently, a regulatory tag for the application 206 may correspond to "finance", based on the service domain of the service request 212. Moreover, based on the operation of the service request 212, the specific set of controls may be associated with data handling of new users. In an example the set of controls may include, but is not limited to, encryption and access controls, user consent controls, type of data controls, data protection (e.g., GDPR, California consumer privacy act (CCPA), etc.) compliance, data transmission controls, data masking and redaction controls, and reporting and notification controls.

Thereafter, the system 202 is configured to output the set of controls associated with the service request 212. In an embodiment, the system 202 is configured to output the set of controls on a user interface associated with the system 202 or a user device that raised the service request 212. In another embodiment, the system 202 is configured to render an audio output indicative of the set of controls.

In an example, the regulatory tag and the set of controls for the service request 212 may be stored in association with the service request 212. Further, before an execution of the service request 212, the request data 214 may be validated to ascertain whether the request data 214 is compliant with the set of controls. To this end, based on the validation, the service request may be executed to perform an operation of the application 206 to provide a service to a user or user device that raised the service request 212. The validation of the request data 214 based on the set of controls enable secure and efficient execution of the service request 212 raised with the application 206 based on specific guidelines and requirements of a domain and an operation pertaining to the service request 212.

The database 208 may include suitable logic, circuitry, interfaces, and/or code that is configured to store the set of defined regulatory tags 210. In an embodiment of the disclosure, the set of defined regulatory tags 210 is associated with regulatory compliances for the application 206. The set of defined regulatory tags 210 includes a PCI DSS tag, a GDPR tag, and a HIPAA tag. In another embodiment of the disclosure, the set of defined regulatory tags 210 is associated with a security rule for the application 206. In an example embodiment of the disclosure, the security rule may correspond to a predefined number of API request for the application 206 in a first time period (such as 10 minutes, 30 minutes, and 1 hour). The set of defined regulatory tags 210 further includes a data authentication tag, a data authorization tag, a data encryption tag, a service communication tag, an API security tag, and a user logging tag.

In an embodiment of the disclosure, a code or a set of instructions associated with the one or more operations, such as corresponding to service and/or microservices, of the application 206 may be updated periodically. Subsequently, for each new service request raised with an updated version of the operation or service of the application 206, the set of controls may be determined. In this regard, when the services of the application 206 are updated, the process of tagging of the updated services of the application 206 may be performed in an automatic manner. Subsequently, the different endpoints or services of the application 206 may be tagged so that request data received through different API requests may be validated before processing or execution thereof. To this end, manual identification of the regulatory compliance or the security rule for the application 206 is eliminated to avoid human errors, delays, and risks of security threats.

Figure 3:
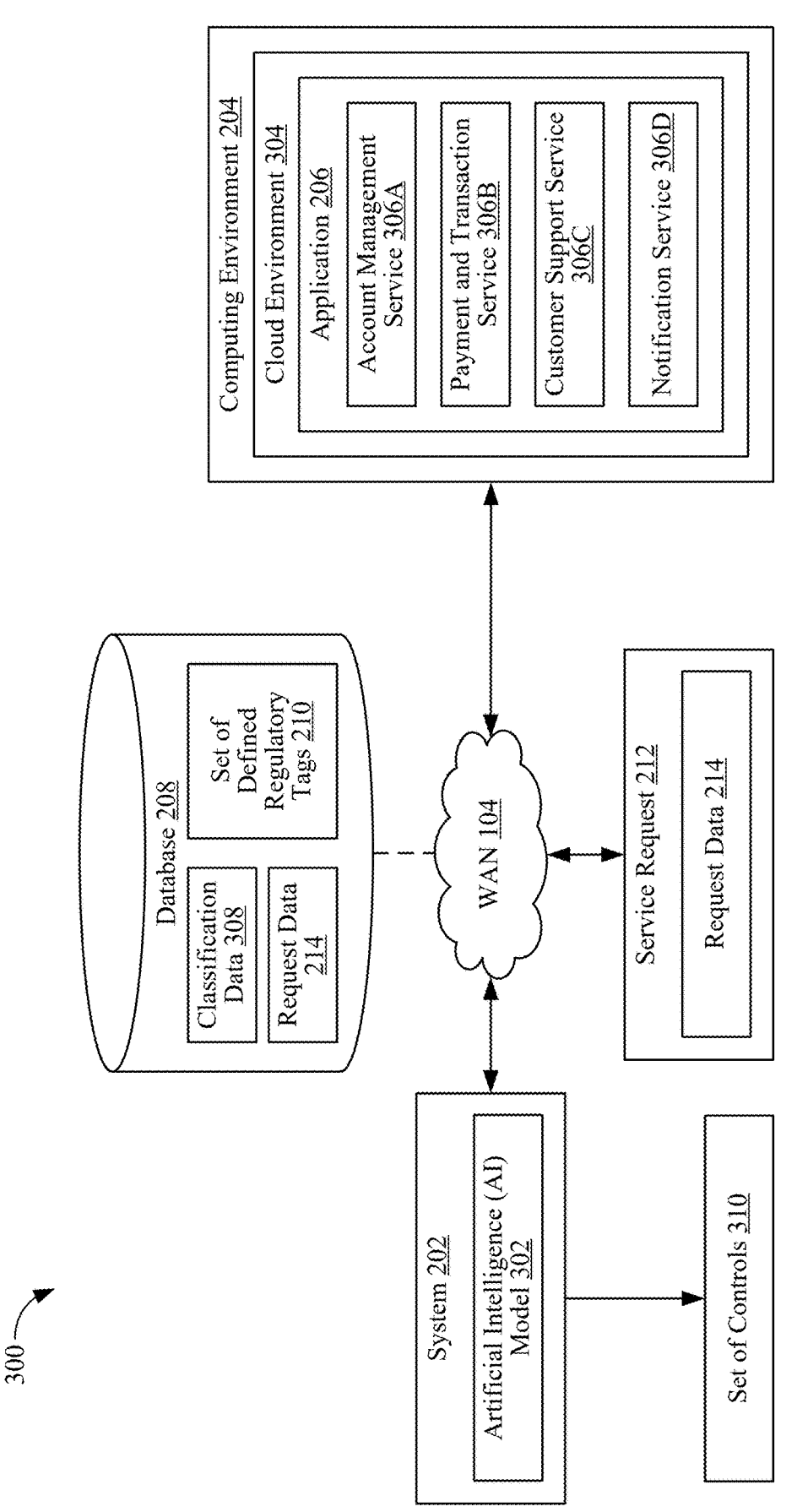
FIG. 3 is a diagram that illustrates a network environment in which the system for automated tagging of an application is implemented, in accordance with an embodiment of the disclosure.

FIG. 3 is a schematic illustration of a network environment 300 in which the system 202 for automated tagging of the application 206 is implemented, in accordance with an embodiment of the disclosure. FIG. 3 is described in conjunction with FIG. 2. The network environment 300 includes the system 202, the computing environment 204, and the database 208. The network environment 200 may further include the WAN 104 of FIG. 1. In an embodiment, the network environment 300 may be an exemplary embodiment of the network environment 200 of FIG. 2.

In an exemplary embodiment, the computing environment 204 may include a cloud environment 304. It may be noted that including the cloud environment 304 within the computing environment 204 is only illustrative and should not be construed as a limitation. In particular, in some cases, the computing environment 204 may be connected to the cloud environment 304, such as via the Internet. The cloud environment 304 may provide infrastructure, platforms, and services provided by a cloud computing provider that enable organizations and individuals to develop, deploy, manage, and scale the application 206 over the internet. Moreover, the computing environment 204 refers to a cloud native, micro service-based environment in which the application 206 is deployed.

In an example, the application 206 may be a collection of services. The collection of services may be accessible through different endpoints of the application 206. In an example, the different services may be provided by different providers and may be aggregated to develop the application 206. The different endpoints may be connected, for example, to provide the different services of the application 206. Each of the different endpoints may correspond to a specific operation, such as retrieving data, submitting data, or performing operations of the application 206. Moreover, the different endpoints may handle different types of requests, such as user management, order processing, data analytics, etc.

Although the application 206 is shown to be provided within a single cloud environment, this should not be construed as a limitation. In other cases, the application 206, specifically, the different services of the application 206 may be provided by different cloud environments in a centralized or a distributed manner. In such a case, the different cloud environments providing the different services may be connected.

Pursuant to the present example, different services of the application 206 may be provided by the cloud environment 304. The cloud environment 304 may vary based on deployment models, service models, and specific technologies used. The cloud environment 304 enables users to access and utilize the application 206. For example, the cloud environment 304 may be a private cloud, a public cloud, a hybrid cloud, or a multi-cloud. Moreover, the cloud environment 304 may operate on any of the service models, such as Infrastructure as a Service (IaaS), Platform as a Service (PaaS), Software as a Service (SaaS), or Container as a Service (CaaS).

In an embodiment, the cloud environment 304 may provide a plurality of services associated with the application 206 that may be used by users. The plurality of services may be dependent on a type of the application 206. In an example, the application 206 may be a banking and finance application, an e-commerce application, a healthcare application, an education application, etc. Examples of these services may include, but are not limited to, account management service 306A, payment and transaction service 306B, customer support service 306C and notification service 306D (collectively referred to as services 306). It may be noted that such examples of the services 306 is non-exhaustive and application 206 may include several other services specific to the type of the application 206.

In an example, the account management service 306A may include functionalities that allow users to manage their accounts, profiles, and related settings. While the specific features may vary depending on the type of the application 206, primarily the account management service 306A may include user registration, authentication, profile management, security settings, and preferences. The account management service 306A may be configured to provide functionalities associated with, for example, sign-up process, verification, social media integration, login, multi-factor authentication, user profile management, password management, security alerts, device management, preferences management, privacy settings, activity and history, subscription and billing, role management, access controls, usage statistics, and so forth. In an example, when the application 206 is related to e-commerce service domain, the account management service 306A may provide functionalities associated with managing shipping addresses, payment methods, and order history. In another example, when the application 206 is related to social media service domain, the account management service 306A may provide functionalities associated with managing friend lists, privacy settings, and content visibility. In yet another example, when the application 206 is related to healthcare service domain, the account management service 306A may provide functionalities associated with managing medical history, health records, and appointment scheduling.

Moreover, the transaction service 306B may provide functionality for handling financial exchanges, purchasing goods or services, and transferring funds. The specific functionality of the transaction service 306B may vary depending on the type of the application 206. In an example, for e-commerce-based application, the transaction service 306B may provide functionalities associated with, for example, shopping cart review, checkout process, payment processing, order confirmation, invoice generation, order tracking, and refunds. In an example, for finance-based application, the transaction service 306B may provide functionalities associated with, for example, account transfers, bill payments, peer-to-peer payments, loan payments, credit card payments, mobile payments, transaction history, payment authentication, and currency exchange.

Further, the customer support service 306C may provide functionality for providing assistance, resolving issues, and enhancing the user experience. The specific functionality of the customer support service 306C may vary depending on the type of the application 206. The customer support service 306C may be configured to provide functionalities associated with, for example, contact channels (e.g., email support, phone support, live chat, in-app messaging, social media support, etc.), self-service resources (e.g., frequently asked questions (FAQs), help centers, community forums, tutorials, etc.), support ticketing system (e.g., ticket creation, ticket tracking, etc.), service level assistance (SLAs), feedback mechanisms, technical support, feature support, and so forth.

In addition, the notification service 306D may provide functionality for providing users with timely information and updates. Notifications may be delivered through various channels, including in-app alerts, push notifications, emails, short message service (SMS), or other messaging platforms. The specific functionality of the notification service 306D may vary depending on the type of the application 206. In an example, for e-commerce-based application, the notification service 306D may provide functionalities associated with, for example, order confirmation, shipping updates, promotions and discounts, cart reminders, price alerts, product alerts, etc. In an example, for finance-based application, the notification service 306D may provide functionalities associated with, for example, balance updates, fraud alerts, payment reminders, investment notifications, account updates, transaction alerts, etc.

In an example, the various services 306 of the application 206 may be implemented in a cloud cluster. Further, the same or different sets of controls may have to be applied while handling service requests for each of the services 306. In an example, a certain service may require application of a security control that mandates that all APIs should have appropriate authorization. To this end, the set of controls for each of the services 306 may be specific to a service or operation and a service domain of the application 206. In an example, when the application 206 is a finance-based application, a PCI DSS control needs to be applied to a service request to ensure that cardholder data is encrypted when transmitted. To this end, each of the services 306 of the application 206 may need to apply certain specific controls to ensure compliance with guidelines and mandates of specific service/operation and the service domain.

In a cloud cluster hosting multiple applications, administrators need to manually identify which controls apply to which services of each of the multiple applications. With regular updates of these applications, updating these controls becomes cumbersome and inefficient. In certain cases, administrators also end up with a large number of false positives of failed controls, i.e., unwanted controls may be applied to data resulting in non-compliance and failed application of the controls. In addition, if the controls are applied in cross domain, i.e., a control of handing cardholder data for finance-based application is applied while handling cardholder data for e-commerce-based application, there is also a need to ensure other data, such as non-cardholder data that may be a part of request data of received service request is not processed based on other controls of the finance-based application.

Subsequently, the system 202 provides techniques to manage a tagging of the application 206 based on corresponding regulatory domain and determining a set of controls specific to each of the services 306 of the application 206. In this regard, the system 202 is configured to obtain the request data 214 associated with the service request 212. The service request 212 is associated with the application 206. The request data 214 may be stored within the database 208. In an example, the request data 214 includes user input data and/or service request resource locator data. For example, the service request resource locator data may correspond to a URL of an endpoint associated with the application 206 for which the service request 212 is raised. Moreover, the user input data may include input data provided by a user or fed automatically by a bot while raising the service request. For example, the user input data may include, but is not limited to, user information (e.g., personal identification information, financial information, transactional information, educational information, employment and occupation information, demographic information, service preferences, authentication information, behavioral data, and consent and agreement), user review and ratings, product information, interaction data, historical data, etc.

In an example, raising the service request 212 with a particular service of the application 206 may include transmitting the request data 214 to the application for processing and execution of the service request 212. Further, the system 202 may be configured to retrieve or receive the request data 214 from the database 208 or by intercepting the service request 212 transmitted to the application 206 from a user device.

Further, the system 202 is configured to generate classification data 308 associated with the service request 212 based on the request data 214. The classification data 308 may be indicative of an operation associated with the application 206, or a service domain associated with the application 206. In an example, the operation associated with the application 206 may indicate a particular service from the services 306 to which the service request 212 pertains. The service domain associated with the application 206 may indicate a business domain or a field of usage of the application 206. The operation and the service domain of the application 206 for which the service request 212 is raised may be identified to classify the service request 212.

In an example, the system 202 may include an artificial intelligence (AI) model 302 for determining the classification data 308 associated with the service request 212. In an example, the AI model 302 may be a ML model configured to understand the request data 214 to determine the classification data 308 associated with the service request 212. In an example, the AI model 302 may be a large language model (LLM). In this regard, the system 202 may be configured to generate a first textual script associated with the service request 212 based on the request data 214. In an example, the first textual script may be a first text prompt indicating various parameters of the request data 214. The system 202 may be configured to input the first textual script associated with the service request 212 to the AI model 302 to receive a first output. For example, the LLM may process the first textual script or the first text prompt to generate the first output. For example, the first output may be human-like text indicating a manner in which the service request 212 may be classified. The AI model 302 or the LLM may be effectively used for classification tasks, which involve assigning predefined categories or labels to the service request 212. In this regard, based on the first text prompt, the AI model 302 or the LLM may produce the first output. For example, the first output may be used by the system 202 to determine the classification data 308 for the service request 212. The classification data 308 may classify the service request 212 based on corresponding operation or service of the application 206 for which the service request 212 is raised, and service domain of the of the application 206 for which the service request 212 is raised.

The system 202 is configured to determine a regulatory tag for the application 206 based on the classification data 308. The regulatory tag is determined from the set of defined regulatory tags 210. In an example, based on the service domain of the service request 212, a regulatory domain of the application 206 may be identified. Further, based on the regulatory domain, the regulatory tag may be assigned to the application 206.

In an example, the regulatory tag may include metadata in the form of key-value pairs to be assigned to the application 206 within the cloud environment 304 or cluster cloud environment. Subsequently, based on the classification data 308 of each of multiple service requests raised for accessing a service of the application 206, the regulatory tag of the application 206 may be determined. For example, tag data of the regulatory tag of the application 206 may include service domain, application's function, deployment region, deployment environment, or a combination thereof. In an example, the tag data of the regulatory tag may include <Finance>. In another example, the tag data of the regulatory tag may include <Category: Finance, Data Sensitivity: High, Region: European Union (EU), Compliance: GDPR>.

In an example, each of the services 306 within the application 206 may be tagged with relevant metadata or regulatory tag. For example, the payment and transaction service 306B for handling payment processing might be tagged as <Payment Service>. In addition, each individual endpoints, or APIs within the application 206 may also be tagged. In certain cases, data and storage services, such as databases, data tables, or storage units within the application 206 may also be tagged based on a type of data they store, such as <customer data>, <transactional data>, or <log data>. Details of tagging each of the services 306 or microservices and endpoints or APIs of the application 206 are further described in conjunction with the FIG. 5.

Thereafter, the system is configured to determine a set of controls 310 associated with the service request 212 based on the regulatory tag. In an example, once the application is tagged, specific controls, i.e., the set of controls 310 for the service request is determined to check compliance of the service request 212 with respect to the service for which the service request 212 is raised. In an example, if the regulatory tag for the application is <finance> and the operation of the service request 212 indicates that the service request is associated with the <new user registration>, then the set of controls 310 may include, for examples, security controls to be enforced at the account management service 306A or an API of user registration to handle or process the user input data associated with the user registration. In an example, the operation or service associated with the application 206 to which the service request 212 pertains is determined based on the service request resource locator data, for example, the URL of the endpoint associated with the application 206 for which the service request 212 is raised.

Further, the system 202 is configured to output the set of controls 310 associated with the service request 212. In an example, the set of controls 310 associated with the service request 212 may then be used for validation of the request data 214 associated with the service request 212. To this end, the set of controls 310 may be associated with a particular service from the services 306 of the application 206. Subsequently, the set of controls 310 may be stored in association with the service in order to validate or authenticate other service requests that may be received or raised for accessing or utilizing the service of the application 206 under consideration.

In an example, the system 202 may be configured to store the set of controls 310. For example, the set of controls 310 may be stored in the database 208.

It may be noted that based on plurality of service requests raised for accessing or using the different services 306 of the application 206, various sets of controls for various endpoints or APIs of the application 206 may be determined. Further, in cases where the cloud environment 304 may be a cluster cloud environment executing multiple applications, sets of controls for different endpoints or APIs of each of the applications are determined. Furthermore, as soon an update in any of the applications is performed, updated set(s) of controls corresponding to the update may be determined. For example, during the addition of a new application service, a new set of controls for the new application may be determined. As may be noted, the new set of controls for this new application service is determined based on request(s) raised for accessing the new application, such as during testing and/or after deployment. Further, in case of an update in an existing service, for example, for bug fixes or modifications, service request(s) that may be received after the update may be used to determine updated set of controls for the service.

A manner in which the system 202 operates to perform automated tagging of the applications based on the regulatory domain of each of the applications is described in detail in conjunction with FIG. 4A, FIG. 4B, FIG. 5, and FIG. 6.

Figures 4A, 4B:
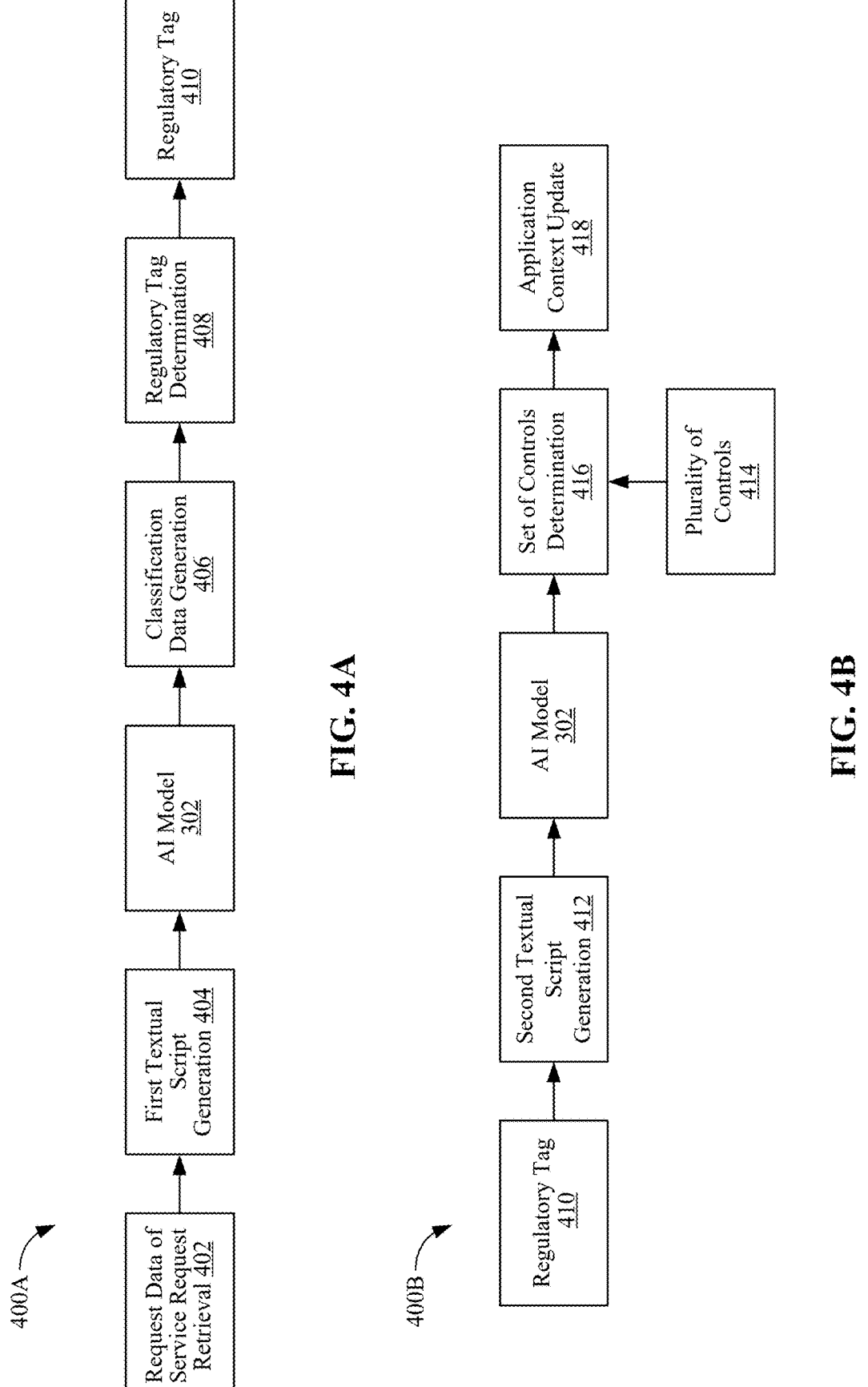
FIG. 4A is a block diagram that illustrates an exemplary operation for determining a regulatory tag for the application, in accordance with various embodiments of the disclosure.
FIG. 4B is a block diagram that illustrates an exemplary operation for determining a set of controls for a service request, in accordance with an example embodiment of the present disclosure.

FIG. 4A illustrates a block diagram 400A of an exemplary operation for determining a regulatory tag 410 for the application 206, in accordance with an example embodiment of the present disclosure. In an example, the steps of the exemplary operation may be implemented by the system 202. FIG. 4A is described in conjunction with elements of the FIG. 2, and FIG. 3.

At 402, the request data 214 of the service request 212 is retrieved. In an example, the request data 214 may be retrieved from the database 208. For example, the service request 212 may be raised by a user using a user device for accessing or utilizing a service of the application 206. Subsequently, the request data 214 may be transmitted to the application 206 for execution of the service request 212, via the WAN 104.

At 404, a first textual script is generated. In an example, the first textual script is associated with the service request 212. The first textual script is generated based on the request data 214. In an example, the first textual script may be a text prompt to be provided to the AI model 302 for processing or determination of classification data. To this end, the first textual script may provide clear and specific instructions or context to guide the AI model to produce a response. Parts of this textual prompt may also be predefined with place-holders that are filled based on every service request. In an example, the first textual prompt may be generated as: "Analyze the request data of the service request and predict which service domain does the service request belong to from a list of following services: Data, Entertainment, Finance, Health & fitness, Location, Mapping, Music, Social, Sports, Text analysis, and Travel. If any of the request doesn't belong to this category, say 'Other'." It may be noted that such an example of the first textual script is only exemplary and should not be construed as a limitation. In other examples, the first textual script may provide more detailed or less detailed instructions for determining service domain of the service request. In another example, the first textual script may be a code or a part of a code to be provided to the AI model 302 for processing or determina-tion of classification data.

Thereafter, the first textual script associated with the service request 212 is input to the AI model 302 to receive a first output. In an example, the AI model 302 may be trained based on a large dataset including, for example, text from books, articles, websites, and more. Subsequently, the AI model 302 may have a large number of parameters. In an example, the AI model 302 may be fine-tuned based on applications data. The applications data may include, but is not limited to, historical service request logs (e.g., text of service requests, labels indicating types of service requests, priority information for service requests, response associ-ated with service requests, timestamps, demographic data associated with the service requests, application version or environment for which service requests are raised, etc.), labelled data comprising requests mapped with correspond-ing response(s), knowledge base (e.g., FAQs, troubleshoot-ing guides, articles, tutorials, etc.) associated with applica-tions, product documentation (e.g., features, functionalities, usage, logic, etc.) associated with the applications, interac-tion data (e.g., user interaction logs, predefined responses interaction logs, etc.) associated with the applications, logs of error messages associated with the applications, technical logs (e.g. performance, errors, resource consumption, errors, etc.) associated with the applications, user profiles data associated with the applications, version and configuration data associated with the applications, and standards and compliance data associated with the applications. To this end, the AI model 302 may be trained or fine-tuned to accurately analyze the first textual script to generate the first output. In an example, the first output may include an indication of a service domain to which the service request 212 may correspond. For example, the AI model 302 may analyze a URL associated with an API or an endpoint of the application 206 for which the service request 212 is raised.

In an example, the AI model 302 may produce the first output. In an example, the first output may be generated as, for example, 'I would classify this service request as _____.' In particular, the blank may be filled based on the service domain associated with the service request 212.

In an example, the request data 214 may include user input data and service request resource locator data. For example, the service request resource locator data may include, but is not limited to, "https://DomainName/api/v1/loans/." Moreover, the user input data may include, but is not limited to, client Id, product Id, principal, loan term fre-quency, loan type, loan term frequency type, number of repayments, link account Id, fixed equated monthly install-ment (EMI) amount, outstanding loan balance, transaction processing strategy Id, expected disbursement date, submit-ted on data, disbursement data, locale, data table informa-tion, account number, balance, date field, date format, and date time field. For example, based on the first textual script comprising the request data 214, the AI model 302 may produce the first output. The first output may be inference results. In an example, the first output may indicate tags associated with the service request 212 as 'banking regula-tory controls' and 'financial data' and relevant data as 'loan amount', 'frequency', 'account number' and 'balance'.

At 406, the system 202 is configured to generate the classification data 308 associated with the service request 212 based on the first output. In particular, the classification data 308 may be used to classify the service request 212 based on an operation associated with the application 206 for which the service request 212 is raised, or a service domain associated with the application 206 for which the service request 212 is raised. In an example, the classifica-tion data 308 for the service request 212 may be determined based on the tags: 'banking regulatory controls' and 'finan-cial data', and relevant data: 'loan amount', 'frequency', 'account number' and 'balance'. To this end, the classifica-tion data 308 may classify the service request as belonging to an operation or service of 'loan payment' and a service domain of 'financial'.

At 408, the system 202 is configured to determine a regulatory tag 410 for the application 206. In an example, based on the classification data 308, the regulatory domain and corresponding regulatory tag for the service request 212 is determined. For example, the regulatory tag may corre-spond to 'financial'. In certain cases, more than one regu-latory tag may be assigned to the application 206.

FIG. 4B illustrates a block diagram 400B of an exemplary operation for determining the set of controls 310 for the service request 212, in accordance with an example embodi-ment of the present disclosure. In an example, the steps of the exemplary operation may be implemented by the system 202. FIG. 4B is described in conjunction with elements of the FIG. 2, FIG. 3, and FIG. 4A.

Once the regulatory tag 410 of the application 206 is determined, at 412, the system 202 is configured to generate a second textual script. In an example, the second textual script is associated with the service request 212. The second textual script is generated based on the regulatory tag 410 for the application 206. In addition, the second textual script is generated based on the request data 214. In an example, the second textual script may be a text prompt to be provided to the AI model 302 for processing or determination of the set of controls 310. To this end, the second textual script may provide clear and specific instructions or context to guide the AI model to produce a response. In an example, the second textual prompt may be generated as: "Analyze the request data of the service request and the tag of the application to identify all possible controls from a list of controls applicable to the service request." It may be noted that such an example of the second textual script is only exemplary and should not be construed as a limitation. In other examples, the second textual script may provide more detailed or less detailed instructions for determining the set of controls 310 of the service request 212. In another example, the second textual script may be a code or a part of a code to be provided to the AI model 302 for processing, i.e., the determination of the set of controls 310.

Thereafter, the second textual script associated with the service request 212 is input to the AI model 302 to receive a second output. In an example, the AI model 302 may be trained based on a large dataset and may be fine-tuned based on security and compliance policies data. The security and compliance policies data may include, but is not limited to, data protection and privacy policies (e.g., GDPR, CCPA, HIPAA, children's online privacy protection act (COPPA), personal information protection and electronic documents act (PIPEDA), data localization, etc.), data security policies (e.g., encryption, access control, multi-factor authentication (MFA), data masking, data loss prevention (DLP), network security, etc.), incident response and management policies (e.g., breach notification, incident response plan, disaster recovery, etc.), data integrity and quality policies (e.g., data accuracy and validation, audit trails, etc.), industry standard compliance policies (e.g., PCI DSS, International Organization for Standardization/International Electrotechnical Commission (ISO/IEC) 27001, system and organization controls (SOC 2), federal information security management act (FISMA), Gramm-Leach-Bliley Act (GLBA), etc.), data retention and disposal policies, data classification and handling policies, third-party and vendor management policies, user awareness and training policies, cross-border data transfer policies, and other specialized policies for specific data (e.g., biometric data policies, intellectual property protection policies, etc.).

To this end, the AI model 302 may be trained or fine-tuned to accurately analyze the second textual script to generate the second output. In an example, the second output may include an indication of a list of policies to which the service request 212 may correspond. For example, the AI model 302 may analyze the request data 214 of the service request 212 and the service domain-specific regulatory tag 410 associated with an API or an endpoint of the application 206 for which the service request 212 is raised.

In an example, the AI model 302 may produce the second output. In an example, the second output may be generated as, for example, 'The service request must comply to policies _____; and may optionally comply to policies _____' In particular, the blank may be filled based on the analysis of the request data 214 associated with the service request 212 and the regulatory tag 410 of the application 206.

In an example, the system 202 may be configured to retrieve a plurality of controls 414 associated with a plurality of regulatory domains. Examples of the plurality of regulatory domains are, for example, GDPR, HIPAA, CCPA, encryption, access control, MFA, PCI DSS, ISO/IEC 27001, etc. For example, each of the policies may include multiple controls to be performed or checked before executing a service request related to the policy. In an example, the controls associated with the GDPR policy may include, data minimization controls, lawful basis for processing controls, consent control, data subject rights controls, encryption controls, pseudonymization controls, access controls, regular security assessment control, etc.

At 416, the system 202, using the AI model 302, is configured to determine the set of controls 310 associated with the service request 212 to the application 206 from the plurality of controls 414. In this regard, the set of controls is associated with the application 206, and specifically with the endpoint or the API of the application for which the service request 212 is raised. In an example, the second output of the AI model 302 may include reference to policies applicable to the service request 212. In such a case, the system 202 may be configured to determine the set of controls 310 associated with the service request 212 based on the second output. For example, by analyzing all controls associated with the policies applicable to the service request 212, the set of controls 310 may be identified. Alternatively, the AI model 302 may determine and output, as part of the second output, the set of controls 310 associated with the service request 212 to the application 206 from the plurality of controls 414.

Subsequently, the identified set of controls 310 is enforced with appropriate parameters on the request data 214 of the service request 212 to check validity of the service request 212. Based on the validation of the request data 214 of the service request 212, at 418, application context is updated. In an example, the system 202 may be configured to update a context of the application based on execution or termination of the service request 212 based on its validation.

In an example, a control for the service request may include "Mark financial operations with amounts>$5,000 for high-risk audit". Subsequently, when the service request 212 corresponds to a financial transaction of, for example, $10,000, the service request 212 may have to be marked for audit. In this manner, the application context is updated based on compliance of the service request 212 with each control of the set of controls 310.

In certain cases, a received service request may correspond to an existing service of the application 206 that has not been modified. In such a case, the regulatory tag of the application may be known and stored with other historical service request logs raised for the existing service of the application 206 under consideration. Subsequently, the regulatory tag of the application 206 need not be determined again. Subsequently, the system 202 may perform step 412 to ascertain controls for processing or executing the service request.

Figure 5:
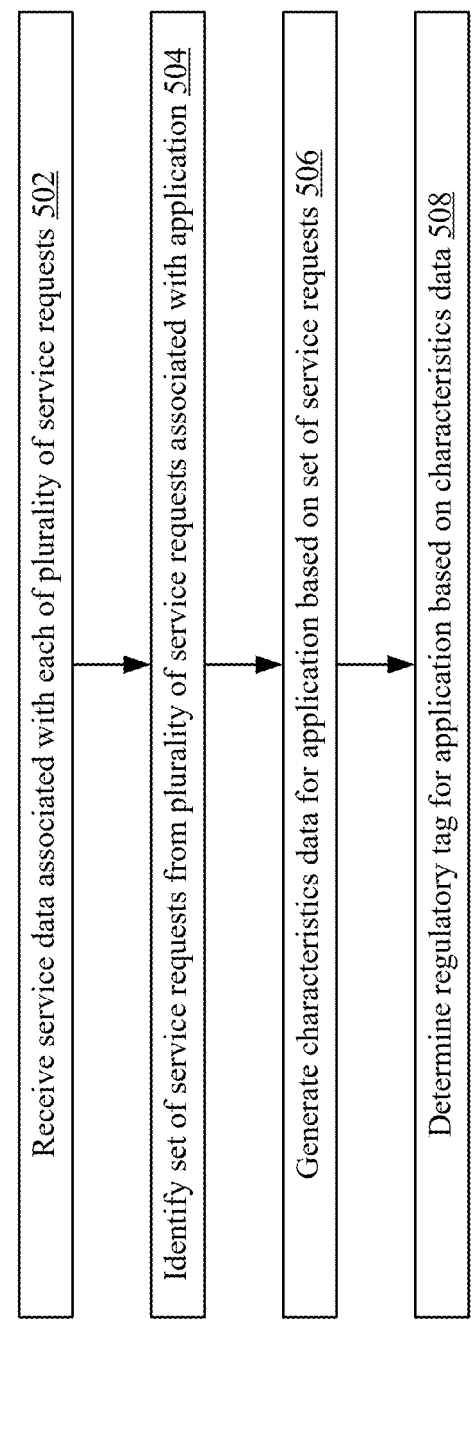
FIG. 5 is a flowchart that illustrates an exemplary method for determining a regulatory tag for each of different services of the application, in accordance with some example embodiments of the present disclosure.

FIG. 5 illustrates a flowchart 500 of an exemplary method for determining a regulatory tag for each of different services of the application 206, in accordance with an embodiment of the disclosure. FIG. 5 is explained in conjunction with is explained in conjunction with element of FIG. 2, FIG. 3, FIG. 4A, and FIG. 4B.

At 502, service data associated with each of a plurality of service requests is received. In an example, the system 202 is configured to receive the service data associated with each of the plurality of service requests. The service request associated with each of the plurality of service requests may include input format data or endpoint data. For example, the plurality of service requests may be raised for accessing services provided by different applications in a cloud environment, such as a cluster cloud environment. The plurality of services may be raised by various users, for example, by transmitting the service data to corresponding applications over the WAN 104. The service data may be an example embodiment of the request data 214. The service data of a service request from the plurality of service requests may include input format data, such as user input data provided for raising the service request, and endpoint data, such as API call, or URL associated with a service to be accessed for executing the service request. In an example, the plurality of service requests may include present or currently raised service requests and/or historical service requests.

At 504, a set of service requests is identified from the plurality of service requests based on the service data of each of the plurality of service requests. In an example, the system 202 may be configured to identify the set of service requests such that the set of service requests is associated with the application. For example, the identified set of service requests is associated with the application 206. The set of service requests may be identified based on the service data of each of the plurality of service requests. In an example, the identified set of service requests may include the service request 212. In such a case, the service data of the service request 212 may correspond to the request data 214. Moreover, based on the service data, such as the endpoint data of a service request, a determination is made to identify an application for which the service request 212 is raised. In this manner, the set of service requests associated with the application 206 is identified. Moreover, the set of service requests may include currently raised, such as active service request(s) as well as historical, such as executed service request(s).

At 506, characteristics data for the application 206 is generated based on the service data associated with each service request of the set of service requests. In an example, the system 202 is configured to generate the characteristics data for the application 206. In this regard, the system 202 may be configured to use the service data, i.e., the endpoint data and the input format data to collate multiple requests, i.e., the set of service requests belonging to the application 206. Further, based on the set of service requests belonging to the application 206, the characteristics data for the application 206 is generated.

In an example, the characteristics data of the application 206 may include a unique identifier or a set of characteristics that can be used to identify the application 206 within the computing environment 204. The characteristics data of the application 206 may include a combination of metadata and behavioral attributes that distinguishes the application 206 from others. The characteristics data for the application 206 may include, but is not limited to, file integrity and verification (e.g., file name, file path, use of file hash(es), digital certificates, etc.), network behavior (e.g., internet protocol (IP) addresses and ports, request type, protocol usage, traffic patterns, etc.), configuration and metadata (e.g., version number, vendor information, etc.), authorized communication channels, and access controls.

At 508, the regulatory tag 410 for the application 206 is determined based on the characteristics data. In an example, the system 202 is configured to determine the regulatory tag 410 for the application 206 based on the characteristics data and classification data associated with each service request of the set of service requests. For example, the classification data may include the classification data 308 associated with the service request 212.

In an example, based on the characteristics data, all possible endpoints, APIs, or services offered by the application 206 may be identified. Further, for each of the APIs or endpoints, one or more service requests from the set of service requests may be identified. Further, based on classification data of the one or more service requests corresponding to a particular service/endpoint/API of the application 206, a regulatory tag may be assigned to the API. A manner in which the regulatory tag is determined for an API of the application 206 from the set of defined regulatory tags 210 is described, for example, in conjunction with FIG. 2, FIG. 3, FIG. 4A and FIG. 4B. Similarly, regulatory tags and regulatory domain for all APIs of the application 206 may be determined.

Figure 6:
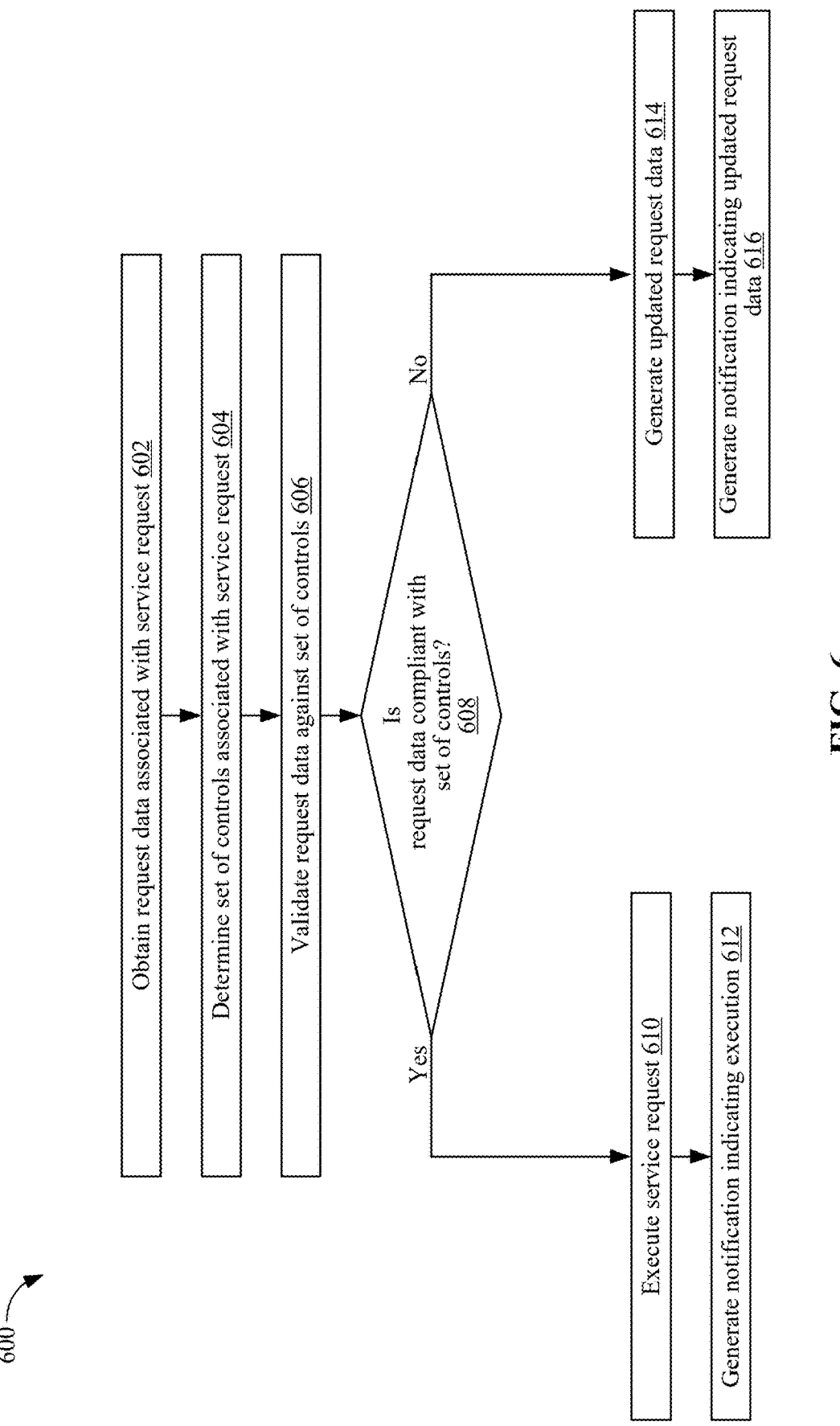
FIG. 6 is a flowchart that illustrates an exemplary method for validating the service request, in accordance with some example embodiments of the present disclosure.

FIG. 6 illustrates a flowchart 600 of an exemplary method for validating the service request 212, in accordance with an embodiment of the disclosure. FIG. 6 is explained in conjunction with is explained in conjunction with element of FIG. 2, FIG. 3, FIG. 4A, FIG. 4B, and FIG. 5.

At 602, the request data 214 associated with the service request 212 is obtained. In an example, the system 202 is configured to obtain the request data 214 associated with the service request 212.

At 604, the set of controls 310 associated with the service request 212 is determined. In an example, the system 202 is configured to determine the set of controls 310 associated with the service request 212. In an example, the set of controls 310 is determined based on the regulatory tag 410 of the application 206 and the request data 214 of the service request 212. Details of determining the regulatory tag 410 of the application 206 are described in conjunction with, for example, FIG. 4A. Moreover, details of determining the set of controls 310 from the plurality of controls 414 applicable to the service request 212 are described in conjunction with, for example, FIG. 4B.

At 606, the request data 214 of the service request 212 is validated against the set of controls 310 associated with the service request 212. In an example, the validation or authentication of the request data 214 may include extracting certain parts of the request data 214 on which the policies may apply. For the part of the request data 214 may be analyzed or checked against the set of controls 310 to ascertain, at 608, if the request data 214 is valid or in compliance with the set of controls 310.

In an example, the service request 212 may be associated with a payment transaction and a control "allow transaction up to a limit of $2000" may be applicable to the service request 212. In such a case, the system 202 may be configured to determine a transaction amount associated with the transaction based on the request data 214. Further, in case the transaction amount is greater than $2000, the request data 214 of the service request 212 may be identified to be invalid or non-compliant with the control. Alternatively, if the transaction amount is less than or equal to $2000, the request data 214 of the service request 212 may be identified to be valid or compliant with the control.

When the request data 214 is found to be valid, i.e., compliant with the set of controls 310, the method moves to 610. At 610, the service request 212 is executed. For example, execution of the service request 212 may correspond to sending the request data 214 to service or microservice of the application for fulfillment of the service request. In an example, an execution of the service request 212 corresponding to the payment transaction may correspond to successful transfer of a monetary amount from sender's account to a receiver's account based on the request data.

Once the service request is executed or fulfilled, at 612, a notification is generated to indicate the execution of the service request 212. In an example, the notification for the successful payment transaction may include a notification, such as a message, an email, an in-app message etc. indicating the completion of the payment transaction.

In certain cases, a notification may also be generated to indicate a validation, i.e., valid, or invalid status of the service request 212.

Further, if at 608, the request data 214 is found to be invalid, i.e., not compliant with the set of controls 310, the method moves to 614. At 614, updated request data is generated. In an example, the system 202 is configured to generate the updated request data based on the request data 214 and the set of controls 310. In an example, the updated request data is compliant with the set of controls 310. Further, the updated request data may be transmitted to the specific service of the application 206 for fulfillment or execution of the service request 212 such that the execution of the service request 212 is in compliance with the set of controls 310.

In certain cases, the set of controls may include certain crucial controls and certain non-crucial controls. In such a case, if the request data 214 is compliant with the crucial controls but not compliant with the non-crucial controls, then the updated request data may be generated based on the request data 214. For example, the updated request data may be compliant with the non-crucial controls to safeguard maximum possible security while using the application 206.

Thereafter, at 616, a notification is generated indicating the updated request data. In an example, the system 202 may be configured to generate the notification to indicate, for example, execution of the service request 212 based on the updated request data or seek permission for the execution of the service request 212 based on the updated request data.

Although the present example describes the generation of updated data to cause compliance of the service request 212 with the set of controls 310. However, this should not be construed as a limitation. In other example, the system 202 may be configured to terminate the execution of the service request 212 on detecting the service request to be invalid. In this regard, the request data 214 may not be transmitted to the specific service of the application 206 for fulfillment of the service request 212. In such a case, the notification may be generated to indicate termination of the service request owing to non-compliance of the request data 214 with the set of controls 310. For example, the notification may include instructions to raise new service requests with the same service of the application 206 such that new request data of the new service request is compliant with the set of controls.

FIG. 7 illustrates a flowchart 700 of an exemplary method for automated tagging of an application based on regulatory domain, in accordance with an embodiment of the disclosure. FIG. 7 is explained in conjunction with is explained in conjunction with element of FIG. 2, FIG. 3, FIG. 4A, FIG. 4B, FIG. 5 and FIG. 6.

At 702, request data associated with a service request is obtained. In an example, the system 202 is configured to obtain the request data 214 associated with the service request 212. The service request 212 is associated with an application 206. In an example, the request data 214 may include user input data or service request resource locator data.

At 704, classification data associated with the service request is generated based on the request data. In an example, the system 202 is configured to generate the classification data 308 associated with the service request 212 based on the request data 214. In an example, the classification data 308 is indicative of an operation associated with the application 206 and/or a service domain associated with the application 206. The operation associated with the application 206 may be indicative of workflow or a service from the services 306 associated with the application 206, and the service domain associated with the application 206 may be indicative of a business domain or a field of usage of the application 206. Based on the operation and/or the service domain, the application 206 is classified.

At 706, a regulatory tag is determined for the application based on the classification data. In an example, the system 202 is configured to determine the regulatory tag 410 for the application 206 based on the classification data 308. The regulatory tag 410 is determined from the set of defined regulatory tags 210. In an example, based on the classification data 308 indicating the service domain of the service request 212, the regulatory tag 410 for the application 206 is determined. In an example, the service domain of the service request 212 may be analyzed with respect to the set of defined regulatory tags 210 to determine the regulatory tag 410 for the application 206.

At 708, a set of controls associated with the service request is determined based on the regulatory tag. In an example, the system 202 is configured to determine the set of controls 310 associated with the service request 212 based on the regulatory tag 410. In an example, the set of controls 310 may include specific guidelines and mandates for handling data or processing requests arising for a specific service of the application 206.

At 710, the request data of the service request is validated against the set of controls associated with the service request. In an example, the system 202 is configured to validate the request data 214 of the service request 212 against the set of controls 310 associated with the service request 212.

At 712, the service request is executed based on the validation of the service request. In an example, the system 202 is configured to execute the service request 212 based on the validation of the service request 212. In an example, for the execution of the service request 212, the request data 214 may be transmitted to the application 206 for serving the service request 212.

Various embodiments of the disclosure may provide a non-transitory computer readable medium and/or storage medium having stored thereon, instructions executable by a machine and/or a computer to operate a system (e.g., the system 202) for automated detection of regulatory domain of applications, tagging of applications based on regulatory domain and determining controls for each of one or more services of each of the applications. The instructions may cause the machine and/or computer to perform operations that include obtaining the request data 214 associated with the service request 212. The service request 212 is associated with the application 206. The operations further include generating the classification data 308 associated with the service request 212 based on the request data 214. The classification data 308 is indicative of an operation associated with the application 206 and/or a service domain associated with the application 206. The operations further include determining the regulatory tag 410 for the application 206 based on the classification data 308. The regulatory tag 410 is determined from the set of defined regulatory tags 210. The operations further include determining the set of controls 310 associated with the service request 212 based on the regulatory tag 410. The operations further include validating the request data 214 of the service request 212 against the set of controls 310 associated with the service request 212. The operations further include executing the service request 212 based on the validation of the service request 212.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining, by a computer, request data associated with a service request, wherein the service request is associated with an application;
    generating, by the computer, a first textual script associated with the service request based on the request data;
    inputting, by the computer, the first textual script associated with the service request to an artificial intelligence (AI) model to receive a first output;
    generating, by the computer, classification data associated with the service request based on the first output, the classification data indicative of at least one of an operation associated with the application or a service domain associated with the application;
    determining, by the computer, a regulatory tag for the application based on the classification data, wherein the regulatory tag is determined from a set of defined regulatory tags;
    determining, by the computer, a set of controls associated with the service request based on the regulatory tag;
    validating, by the computer, the request data of the service request against the set of controls associated with the service request; and
    executing, by the computer, the service request based on the validation of the service request.

2. The computer-implemented method of claim 1, further comprising generating, by the computer, a notification associated with the service request based on the validation.

3. The computer-implemented method of claim 1, further comprising:
    generating, by the computer, updated request data associated with the service request upon detection of an invalid service request, wherein
        the updated request data is generated based on the request data and the set of controls, and
        the updated request data is compliant with the set of controls.

4. The computer-implemented method of claim 1, further comprising:
    receiving, by the computer, service data associated with each service request of a plurality of service requests, wherein the service data associated with each service request of the plurality of service requests comprises at least one of input format data or endpoint data;
    identifying, by the computer, a set of service requests from the plurality of service requests based on the service data of each service request of the plurality of service requests, wherein
        the set of service requests is associated with the application, and the set of service requests comprises the service request;
    generating, by the computer, characteristics data for the application based on the service data, wherein the service data is associated with each service request of the set of service requests; and
    determining, by the computer, the regulatory tag for the application based on the characteristics data.

5. The computer-implemented method of claim 4, further comprising:
    determining, by the computer, interface data associated with one or more interface components of the application based on the set of service requests, wherein the set of service requests is associated with the application; and
    determining, by the computer, a set of regulatory controls associated with each interface component of the one or more interface components based on the characteristics data and the regulatory tag.

6. The computer-implemented method of claim 1, further comprising:
    generating, by the computer, a second textual script associated with the service request based on the regulatory tag for the application;
    inputting, by the computer, the second textual script associated with the service request to the AI model to receive a second output; and
    determining, by the computer, the set of controls associated with the service request based on the second output.

7. The computer-implemented method of claim 6, further comprising:
    retrieving, by the computer, a plurality of controls associated with a plurality of regulatory domains; and
    determining, by the computer, using the AI model, the set of controls associated with the service request from the plurality of controls, wherein the set of controls is associated with the application.

8. The computer-implemented method of claim 1, wherein the AI model is a large language model (LLM).

9. The computer-implemented method of claim 1, wherein the request data comprises at least one of user input data or service request resource locator data.

10. A computer system, comprising:
    a processor set;
    one or more computer-readable storage media; and
    program instructions stored on the one or more computer-readable storage media, the program instructions executable by the processor set to cause the processor set to:
        obtain request data associated with a service request, wherein the service request is associated with an application;
        generate a first textual script associated with the service request based on the request data;
        input the first textual script associated with the service request to an artificial intelligence (AI) model to receive a first output;
        generate classification data associated with the service request based on the first output, the classification data indicative of at least one of an operation associated with the application or a service domain associated with the application;
        determine a regulatory tag for the application based on the classification data, wherein the regulatory tag is determined from a set of defined regulatory tags;

determine a set of controls associated with the service request based on the regulatory tag;

validate the request data of the service request against the set of controls associated with the service request; and execute the service request based on the validation of the service request.

11. The computer system of claim 10, wherein the program instructions further cause the processor set to:

receive service data associated with each service request of a plurality of service requests, wherein the service data associated with each service request of the plurality of service requests comprises at least one of input format data or endpoint data;

identify a set of service requests from the plurality of service requests based on the service data of each service request of the plurality of service requests, wherein the set of service requests is associated with the application, and the set of service requests comprises the service request;

generate characteristics data for the application based on the service data, wherein the service data is associated with each service request of the set of service requests; and determine the regulatory tag for the application based on the characteristics data.

12. The computer system of claim 11, wherein the program instructions further cause the processor set to:

determine interface data associated with one or more interface components of the application based on the set of service requests, wherein the set of service requests is associated with the application; and determine a set of regulatory controls associated with each interface component of the one or more interface components based on the characteristics data and the regulatory tag.

13. The computer system of claim 10, wherein the program instructions further cause the processor set to:

generate a second textual script associated with the service request based on the regulatory tag for the application;

input the second textual script associated with the service request to the AI model to receive a second output; and determine the set of controls associated with the service request based on the second output.

14. The computer system of claim 13, wherein the program instructions further cause the processor set to:

retrieve a plurality of controls associated with a plurality of regulatory domains; and determine, using the AI model, the set of controls associated with the service request from the plurality of controls, wherein the set of controls is associated with the application.

15. The computer system of claim 10, wherein the program instructions further cause the processor set to generate updated request data associated with the service request upon detection of an invalid service request, wherein the updated request data is generated based on the request data and the set of controls, and wherein the updated request data is compliant with the set of controls.

16. A computer program product comprising a computer-readable storage medium having program instructions, which when executed by a system, cause the system to:

obtain request data associated with a service request, wherein the service request is associated with an application;

generate a first textual script associated with the service request based on the request data;

input the first textual script associated with the service request to an artificial intelligence (AI) model to receive a first output;

generate classification data associated with the service request based on the first output, the classification data indicative of at least one of an operation associated with the application or a service domain associated with the application;

determine a regulatory tag for the application based on the classification data, wherein the regulatory tag is determined from a set of defined regulatory tags;

determine a set of controls associated with the service request based on the regulatory tag;

validate the request data of the service request against the set of controls associated with the service request; and execute the service request based on the validation of the service request.

17. The computer program product of claim 16, wherein the program instructions further cause the system to:

receive service data associated with each service request of a plurality of service requests, wherein the service data associated with each service request of the plurality of service requests comprises at least one of input format data or endpoint data;

identify a set of service requests from the plurality of service requests based on the service data of each service request of the plurality of service requests, wherein the set of service requests is associated with the application, and the set of service requests comprises the service request;

generate characteristics data for the application based on the service data, wherein the service data is associated with each service request of the set of service requests; and determine the regulatory tag for the application based on the characteristics data.

18. The computer program product of claim 17, wherein the program instructions further cause the system to:

determine interface data associated with one or more interface components of the application based on the set of service requests, wherein the set of service requests is associated with the application; and determine a set of regulatory controls associated with each interface component of the one or more interface components based on the characteristics data and the regulatory tag.

* * * * *